United States Patent
Hirota (10) Patent No.: US 10,564,522 B2
(45) Date of Patent: Feb. 18, 2020

(54) OCCUPANT MONITORING DEVICE

(71) Applicant: Satoshi Hirota, Aichi (JP)

(72) Inventor: Satoshi Hirota, Aichi (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/196,363

(22) Filed: Nov. 20, 2018

(65) Prior Publication Data

US 2019/0158710 A1    May 23, 2019

(30) Foreign Application Priority Data

Nov. 21, 2017    (JP) ................ 2017-223396

(51) Int. Cl.
| | | |
|---|---|---|
| G03B 17/08 | (2006.01) | |
| H04N 5/225 | (2006.01) | |
| G03B 15/03 | (2006.01) | |
| B60R 1/00 | (2006.01) | |
| G03B 17/55 | (2006.01) | |

(52) U.S. Cl.
CPC .............. *G03B 17/08* (2013.01); *B60R 1/00* (2013.01); *G03B 15/03* (2013.01); *G03B 17/55* (2013.01); *H04N 5/2252* (2013.01); *H04N 5/2256* (2013.01); *H04N 5/22521* (2018.08); *B60R 2300/8006* (2013.01)

(58) Field of Classification Search
CPC ...... H04N 5/2252; H04N 5/2256; B60R 1/00; B60R 2300/8006; G03B 15/03; G03B 17/08; G03B 17/55

See application file for complete search history.

(56) References Cited

U.S. PATENT DOCUMENTS

| | | | | |
|---|---|---|---|---|
| 9,661,201 | B2 * | 5/2017 | Tsai | H04N 5/2254 |
| 10,272,848 | B2 * | 4/2019 | Troxel | G07C 5/0866 |
| 2006/0209187 | A1 * | 9/2006 | Farneman | G08B 13/19619 |
| | | | | 348/143 |
| 2007/0176402 | A1 * | 8/2007 | Irie | G06K 9/00362 |
| | | | | 280/735 |
| 2009/0046149 | A1 * | 2/2009 | Ohsumi | B60R 11/04 |
| | | | | 348/148 |

(Continued)

FOREIGN PATENT DOCUMENTS

| | | |
|---|---|---|
| JP | H10-254053 A | 9/1998 |
| JP | 2004-078778 A | 3/2004 |
| JP | 2009-200718 A | 9/2009 |

*Primary Examiner* — John R Schnurr (74) *Attorney, Agent, or Firm* — Osha Liang LLP (57) ABSTRACT

An occupant monitoring device images a driver in a vehicle by an imager, projects light toward a driver seat side by an illuminator, controls operation of the imager and the illuminator by a controller, monitors the driver, based on a captured image by the imager, and outputs a monitoring result. A main board on which the controller is mounted is contained in a housing, and a sub-board is held by a lid body configured to close an opening of the housing. The main board and the sub-board are electrically connected so that the imager and the illuminator mounted on the sub-board face the driver seat side. A water preventing cover covers the sub-board, the lid body, and the housing from the driver seat side, the water preventing cover having a transmitting portion configured to transmit projected light from the illuminator and reflected light from the driver.

6 Claims, 8 Drawing Sheets

(56) References Cited

U.S. PATENT DOCUMENTS

| | | | | |
|---|---|---|---|---|
| 2010/0260495 | A1* | 10/2010 | Usami | B60R 11/04 |
| | | | | 396/419 |
| 2010/0321497 | A1* | 12/2010 | Onishi | B60R 1/10 |
| | | | | 348/148 |
| 2015/0085121 | A1* | 3/2015 | Englander | H04N 7/183 |
| | | | | 348/148 |
| 2016/0185354 | A1* | 6/2016 | Lisseman | B62D 1/046 |
| | | | | 701/36 |
| 2016/0381292 | A1* | 12/2016 | Lu | H04N 5/23238 |
| | | | | 348/36 |
| 2017/0156673 | A1* | 6/2017 | Uchida | A61B 5/6893 |
| 2017/0264797 | A1* | 9/2017 | Trinh | A61B 5/18 |
| 2017/0291548 | A1* | 10/2017 | Kim | G03B 15/05 |
| 2017/0313248 | A1* | 11/2017 | Kothari | B60K 35/00 |
| 2018/0198961 | A1* | 7/2018 | Frederick | H04N 5/2254 |
| 2019/0168669 | A1* | 6/2019 | Lintz | B60R 1/00 |

* cited by examiner

FIG. 1

Occupant monitoring device 100

A-A cross section

OCCUPANT MONITORING DEVICE

CROSS-REFERENCE TO RELATED APPLICATION

This application is based on Japanese Patent Application No. 2017-223396 filed with the Japan Patent Office on Nov. 21, 2017, the entire contents of which are incorporated herein by reference.

FIELD

The present invention relates to a waterproof structure of an occupant monitoring device configured to monitor an occupant of a vehicle, based on a captured image.

BACKGROUND

An occupant monitoring device configured to monitor a physical condition of an occupant of a vehicle, based on a captured image may be installed in a vehicle compartment in order to prevent a vehicle accident or the like.

For example, in an occupant monitoring device disclosed in Japanese Patent Application Laid-Open No. 2004-78778, a face of a driver in a vehicle is continuously imaged by an imaging unit, and a predetermined area corresponding to the face in a captured image is set by an area setter. Images of the predetermined area are collected in time series, difference values of the images are calculated by a time difference value calculator, and a direction of the face is determined by a face direction determiner, based on the difference values. The imaging unit is configured of a camera or an image sensor (imaging element) such as a CCD (Charge Coupled Device) or a CMOS (Complementary Metal Oxide Semiconductor) or the like. The area setter, the time difference value calculator, and the face direction determiner are provided in a controller such as a microcomputer or the like.

In addition, in an occupant monitoring device of Japanese Patent Application Laid-Open No. 2009-200718, an imager configured to image a driver seat direction is installed on a steering column of a vehicle, and a plurality of illuminators configured to project near-infrared light in the driver seat direction are embedded in a rim of the steering column. The imager is configured of a near infrared CCD camera, and the illuminators are each configured of an LED (light emitting diode). A controller such as a driver monitor ECU (electronic controller) or the like controls operation of the imager and the illuminators, and processes an image captured by the imager, and detects a direction of a face of a driver and an opening/closing degree of eyes to output a detection result to a driver support system ECU.

An imager is contained in a housing (frame) as disclosed in, for example, Japanese Patent Application Laid-Open No. Hei 10-254053. In Japanese Patent Application Laid-Open No. Hei 10-254053, a window is provided in the housing in order to allow external light to enter the imager. The window is configured of a plate-like member having a light transmission property, and is fitted in a through hole formed in the housing. An interior of the housing is waterproofed by arranging the plurality of windows in parallel or sandwiching an O-ring between each of the windows and the housing.

SUMMARY

The occupant monitoring device is installed in the vehicle compartment with the imager facing the occupant in order to monitor the occupant of the vehicle. In addition, in order to alleviate resistance feeling of the occupant against being monitored, at least the imager is covered with a design cover having an appropriate appearance. However, for example, if a liquid such as a drink or the like held by the occupant falls on the design cover, the liquid passes through a gap between the design cover and the occupant monitoring device, and enters the imager, the illuminators, and the controller of the occupant monitoring device. As a result, there is a possibility that an electric circuit is short-circuited, and that the occupant monitoring device breaks down.

It is an object of the present invention to provide an occupant monitoring device capable of suppressing breakdown due to wetting.

An occupant monitoring device according to the present invention includes: an imager configured to image an occupant of a vehicle; an illuminator configured to project light toward an occupant side; and a controller configured to control operation of the imager and the illuminator, and monitor the occupant, based on an image captured by the imager to output a monitoring result. Further, the occupant monitoring device further includes: a first board on which the controller is mounted; a second board on which the imager and the illuminator are mounted; a housing configured to contain the first board; a lid body configured to close an opening of the housing and hold the second board on a side opposite to the first board so that the imager and the illuminator face the occupant side; connection wiring penetrating the lid body, and electrically connecting the first board and the second board; and a water preventing cover configured to cover the second board, the connection wiring, the lid body, and the housing from the occupant side, and transmit projected light from the illuminator and reflected light from the occupant.

According to the foregoing, even if a liquid falls on the occupant monitoring device, the water preventing cover can prevent the second board, the imager, the illuminator, the connection wiring, the lid body, and the housing from becoming wet. In addition, the water preventing cover can also prevent the liquid from coming to the first board in the housing through a gap between the connection wiring and the lid body, or through a gap between the lid body and the housing. Therefore, a short circuit can be restrained from occurring in the imager, the illuminator, the second board, the controller, the first board, the connection wiring, or the like, thereby causing the breakdown of the occupant monitoring device. In addition, even when the second board is covered with the water preventing cover from the occupant side, the water preventing cover transmits the projected light from the illuminator and the reflected light from the occupant, so that there is no obstacle to the imaging of the occupant by the imager.

In the present invention, the opening of the housing may be a containing port of the first board opened upward, the first board may be contained in the housing with a plate surface thereof oriented horizontally, the second board may be held by the lid body with a plate surface thereof oriented vertically so that the second board is located above a center of the first board, and the water preventing cover may also cover the second board from above.

Further, in the present invention, the water preventing cover may have: a horizontal portion covering an upper surface of the lid body; an upper protruding portion protruding upward continuously from the horizontal portion to cover the second board; and a hanging portion hanging continuously from the horizontal portion to cover a gap between respective side surfaces of the lid body and the housing, the respective side surfaces facing the occupant side.

Further, in the present invention, the water preventing cover may have a transmitting portion configured to transmit the projected light and the reflected light, and the transmitting portion may be formed into a flat plate shape.

Further, in the present invention, the transmitting portion may be a separate body from the other portions of the water preventing cover, and may be fitted in a through hole formed in the water preventing cover.

Further, in the present invention, the housing may have a heat radiator configured to radiate heat generated from the controller and retained in the first board, and the heat radiator may be provided on a side opposite to the second board with respect to the first board, and may not be covered with the water preventing cover.

According to the present invention, there can be provided an occupant monitoring device capable of suppressing breakdown due to wetting.

DETAILED DESCRIPTION

Hereinafter, embodiments of the present invention will be described with reference to the drawings. In respective figures, the same or corresponding parts are denoted by the same reference numerals.

First, an electrical configuration of an occupant monitoring device 100 according to an embodiment will be described with reference to FIG. 1.

Figure 1:
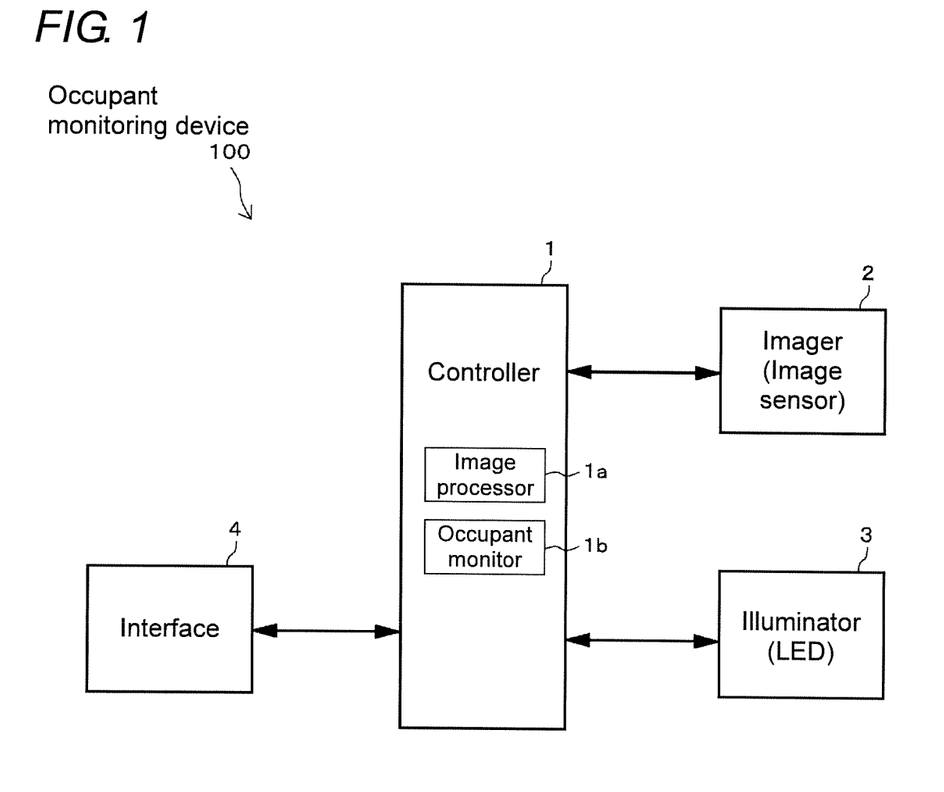
FIG. 1 is an electrical configuration diagram of an occupant monitoring device according to an embodiment of the present invention.

FIG. 1 is an electrical configuration diagram of the occupant monitoring device 100. The occupant monitoring device 100 is installed in a front portion inside a vehicle compartment of a vehicle such as a four-wheeled automobile. The occupant monitoring device 100 is provided with a controller 1, an imager 2, illuminators 3, and an interface 4 as an electrical configuration.

Figure 6:
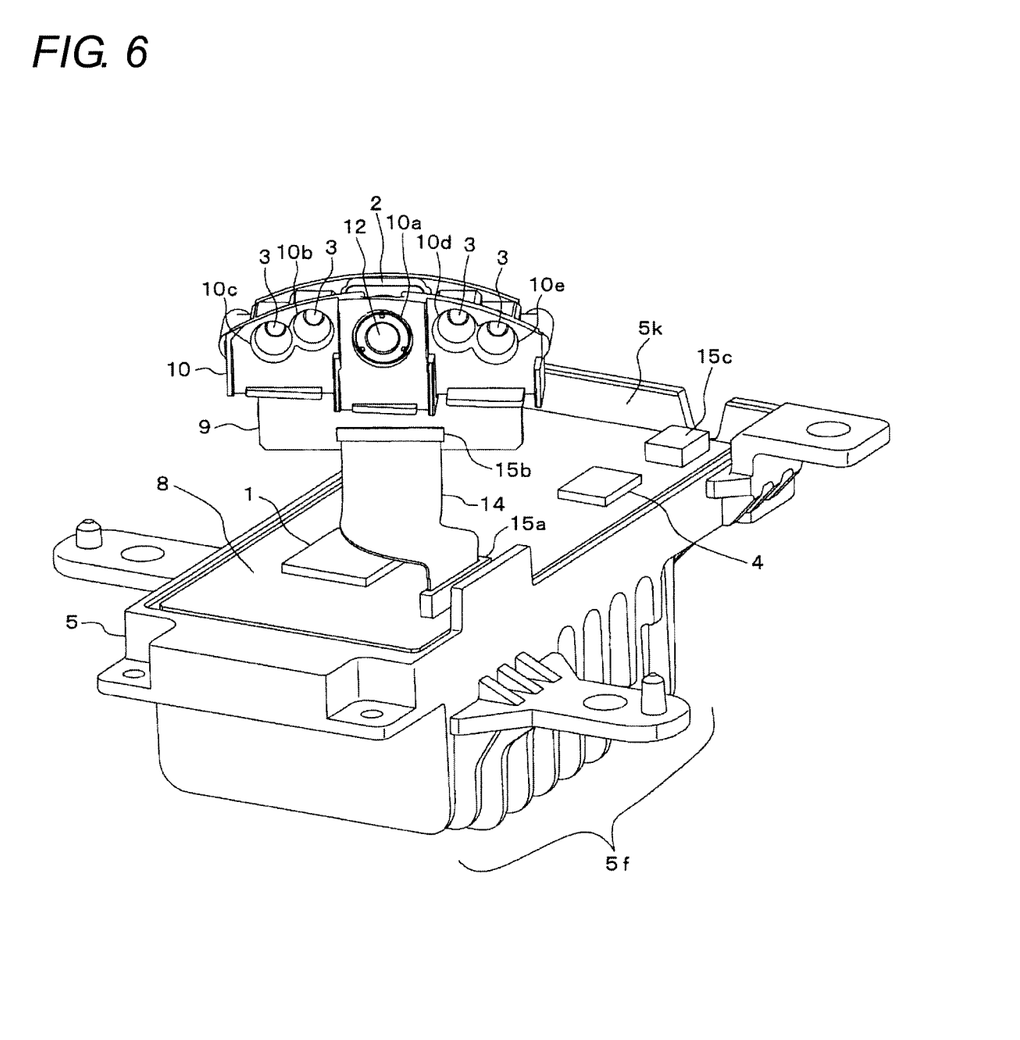
FIG. 6 is a perspective view of a state where optical filters are removed from FIG. 5.

The controller 1 is configured of a microcomputer and a memory. The controller 1 is provided with an image processor 1a and an occupant monitor 1b. The imager 2 is configured of an infrared image sensor (imaging element). The illuminators 3 are each configured of an infrared LED (light emitting diode). Although the illuminators 3 are shown in one block in FIG. 1, a plurality of illuminators 3 are provided as shown in FIG. 6, which will be described later. The interface 4 is configured of a circuit for in-vehicle communication such as CAN (Controller Area Network) or the like.

The imager 2 images a face of a driver who is an occupant of the vehicle. The illuminators 3 project infrared light to an area including the face of the driver. The controller 1 controls imaging operation of the imager 2 and light emission operation of the illuminators 3.

The image processor 1a of the controller 1 performs image processing to an image captured by the imager 2, and detects feature points of the face of the driver in time series. The occupant monitor 1b detects a direction of the face of the driver, states of opening and closing of eyes, a visual line and the like, based on changes of the feature points of the face, monitors these changes, and determines whether or not there is abnormality with the driver, the abnormality interfering with the operation of the vehicle. The controller 1 outputs a monitoring result of the occupant monitor 1b to other ECUs and the like provided in the vehicle via the interface 4. Further, the controller 1 receives information on a vehicle speed of the vehicle, a getting on/off state of the driver, and the like from the other ECUs and various sensors provided in the vehicle.

Next, a mechanical configuration of the occupant monitoring device 100 will be described with reference to FIGS. 2 to 10.

Figure 2:
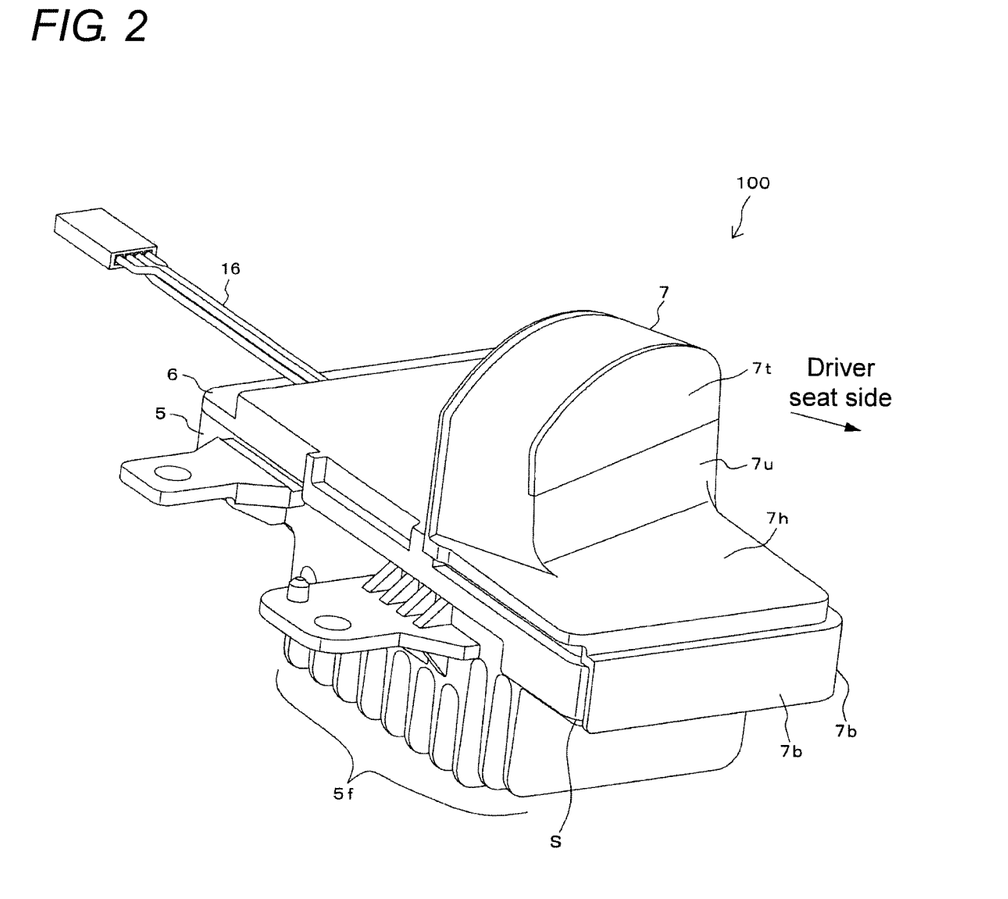
FIG. 2 is a perspective view of the occupant monitoring device according to the embodiment of the present invention.
Figure 3:
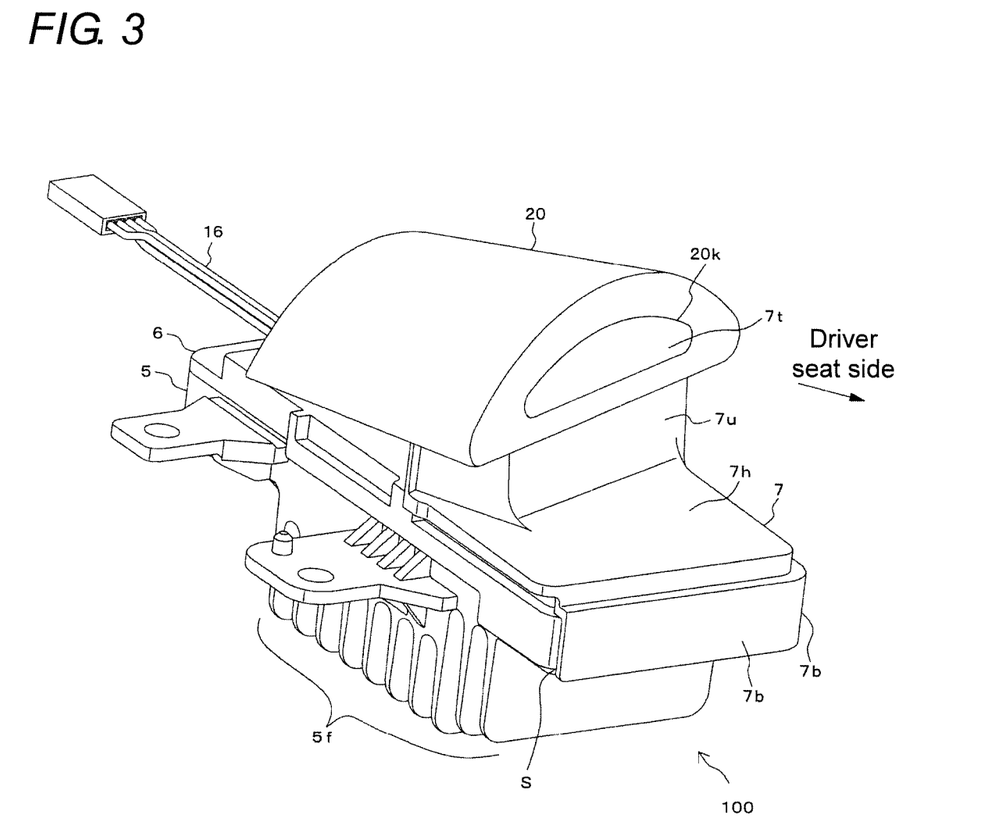
FIG. 3 is a perspective view of a state where a design cover is attached to the occupant monitoring device in FIG. 2.
Figure 4:
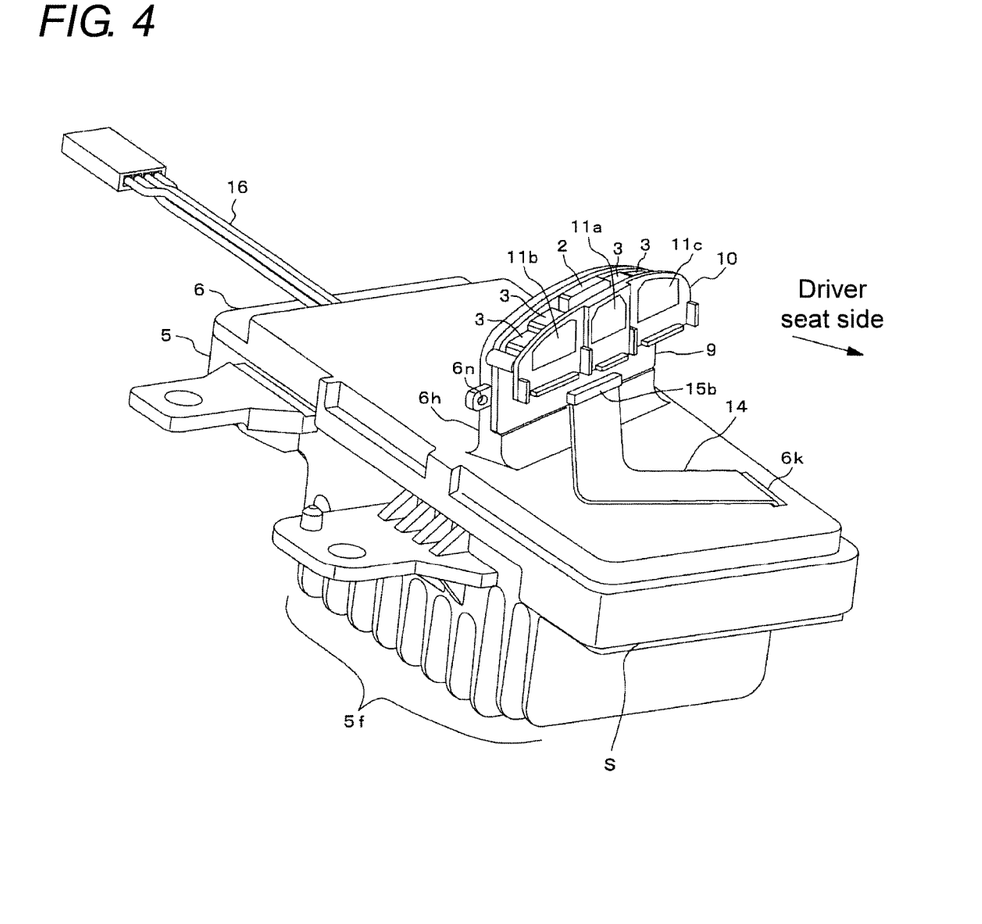
FIG. 4 is a perspective view of a state where a water preventing cover is removed from the occupant monitoring device in FIG. 2.
Figure 5:
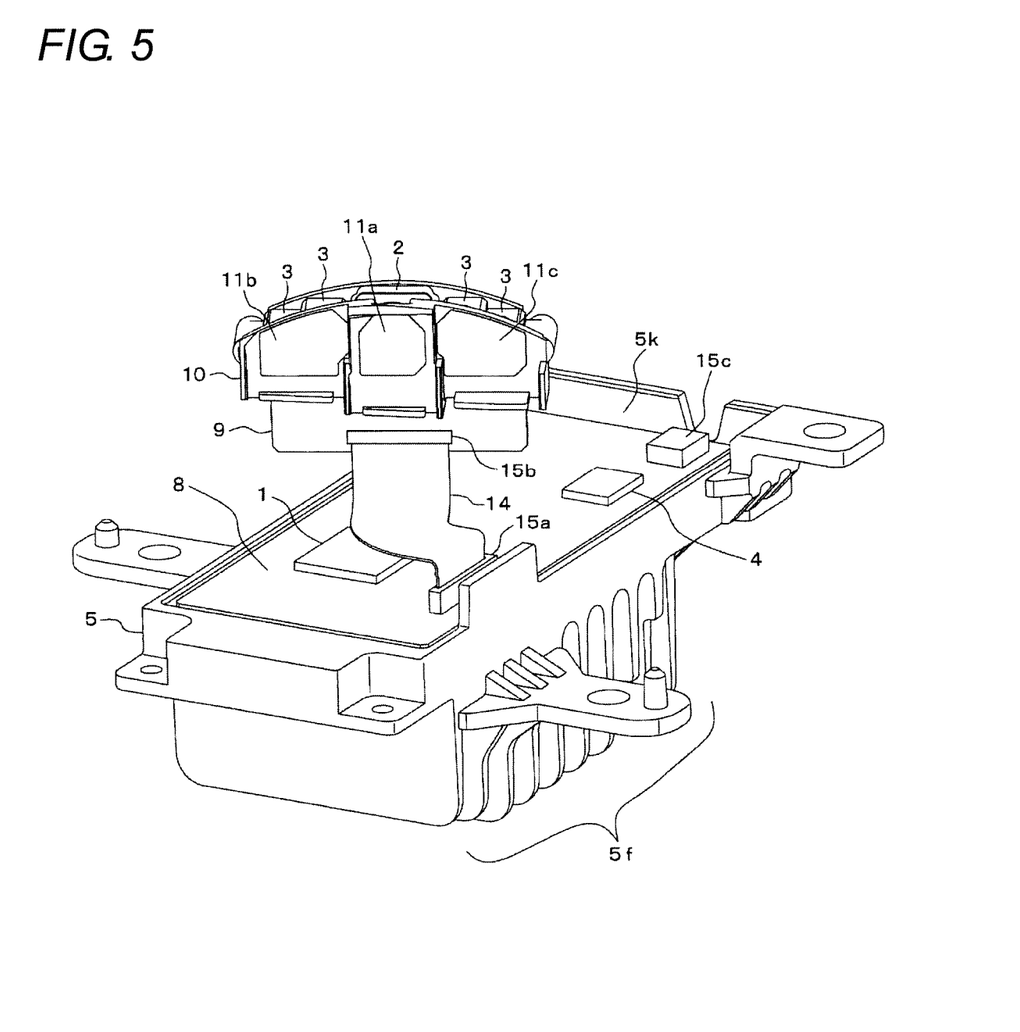
FIG. 5 is a perspective view of a state where a lid body and a harness are removed from FIG. 4.

FIG. 2 is a perspective view of the occupant monitoring device 100. FIG. 3 is a perspective view of a state where a design cover 20 is attached to the occupant monitoring device 100 in FIG. 2. FIG. 4 is a perspective view of a state where a water preventing cover 7 is removed from the occupant monitoring device 100 in FIG. 2. FIG. 5 is a perspective view of a state where a lid body 6 and a harness 16 are removed from FIG. 4. FIG. 6 is a perspective view of a state where optical filters 11a, 11b, 11c are removed from FIG. 5.

The occupant monitoring device 100 is provided with a housing 5, the lid body 6, the water preventing cover 7, and the harness 16, which are shown in FIG. 2 and the like, and a main board 8, a sub-board 9, a reflector 10, an FPC (Flexible Printed Circuit) 14 and the like, which are shown in FIG. 5 and the like.

As shown in FIGS. 2 and 3, in a posture where the housing 5 is located on a lower side, and the water preventing cover 7 is located on an a upper side, the occupant monitoring device 100 is installed in a center upper portion of a dashboard inside the vehicle compartment of the vehicle, or in an upper portion of a center console. Further, the occupant monitoring device 100 is installed so that a front surface (surface opposite to the harness 16) of the occupant monitoring device 100 faces a driver seat side of the vehicle, the front surface facing a lower right side in FIG. 2.

As shown in FIG. 3, the design cover 20 is put on an upper portion of the water preventing cover 7. The design cover 20 covers the occupant monitoring device 100 in order to restrain the occupant from becoming uncomfortable due to being monitored by the occupant monitoring device 100, and has an appropriate appearance. In FIG. 3, a portion of the occupant monitoring device 100 below the design cover 20 is embedded in the dashboard or the center console of the vehicle, so that the occupant cannot see the relevant portion.

As shown in FIG. 5 and the like, the housing 5 is formed of a metal or a synthetic resin having high thermal conductivity into a rectangular box shape. In a lower portion of the housing 5, a fin-shaped heat radiator 5f is provided. The main board 8 is contained inside the housing 5. A plate surface of the main board 8 is horizontally oriented (substantially parallel to a horizontal direction).

On the main board 8, the controller 1, the interface 4, connectors 15a, 15c, and other electronic components and electric circuits (not shown) are mounted. The controller 1 and the interface 4 are each configured of a semiconductor element or the like. In addition, the semiconductor element configuring the controller 1 is an electronic component having a large heat value during energization. One end of the FPC 14 is connected to the connector 15a. One end of the harness 16 shown in FIG. 2 and the like is connected to the connector 15c (not shown in detail). The main board 8 is an example of a "first board" of the present invention.

An opening 5k opened upward in the housing 5 is a containing port configured to contain the main board 8. As shown in FIGS. 2 to 4, this opening 5k is closed by the lid body 6. The housing 5 and the lid body 6 are fixed by screws (not shown) or the like. The lid body 6 is formed of a metal or a synthetic resin. As shown in FIG. 4, the lid body 6 is provided with a holder 6h and a through hole 6k.

The holder 6h is formed so as to protrude upward from a center of an upper surface of the lid body 6. The lid body 6 holds the sub-board 9 on a side opposite to the main board 8 by the holder 6h. The holder 6h and the sub-board 9 are fixed by screws (not shown) or the like. A plate surface of the sub-board 9 is vertically oriented (substantially parallel to a vertical direction). In other words, the sub-board 9 is held by the holder 6h of the lid body 6 with the plate surface thereof vertically oriented so that the sub-board 9 is located above a center of the main board 8.

On the sub-board 9, the imager 2, the illuminators 3, the connector 15b, and the other electronic components and electric circuits (not shown) are mounted. The plate surface of the sub-board 9 is inclined with respect to each side of the housing 5 and the lid body 6, and the sub-board 9 is held by the holder 6h so that the imager 2 and the illuminators 3 face the driver seat side of the vehicle. The sub-board 9 is an example of a "second board" of the present invention.

Another end of the FPC 14 is connected to the connector 15b. The FPC 14 penetrates the through hole 6k of the lid body 6. This FPC 14 allows the sub-board 9 and the main board 8 to be electrically connected. The FPC 14 is an example of "connection wiring" of the present invention.

The reflector 10 configured to reflect light is provided on a side of a surface of the sub-board 9 (surface facing the lower right side in FIG. 4 and the like). The sub-board 9 and the reflector 10 are fixed by screws (not shown) or the like. The reflector 10 is provided with the optical filters 11a, 11b, 11c. Further, as shown in FIG. 6, a plurality of through holes 10a to 10e are formed in the reflector 10.

Among them, a light receiving lens 12 is fitted in the through hole 10a having a large diameter at a center. The imager 2 is provided behind the light receiving lens 12. As shown in FIGS. 4 and 5, the through hole 10a and the light receiving lens 12 are covered with the optical filter 11a.

As shown in FIG. 6, the illuminators 3 are provided behind the through holes 10b to 10e each having a small diameter, respectively. As shown in FIGS. 4 and 5, the pair of through holes 10d and 10e on a right side is covered with the optical filter 11c. As shown in FIGS. 4 and 5, the pair of through holes 10b and 10c on a left side in FIG. 6 is covered with the optical filter 11b.

Light (infrared light) emitted from the respective illuminators 3 in FIG. 6 passes through the through holes 10b to 10e and the optical filters 11b and 11c, and is projected to the driver seat side. At this time, the optical filters 11b and 11c perform predetermined optical adjustment to the light projected from the respective illuminators 3.

The light coming from the driver seat side passes through the through hole 10a and the optical filter 11a, is condensed by the light receiving lens 12, and enters the imager 2. At this time, the optical filter 11a performs predetermined optical adjustment to the light coming from the driver seat side.

The water preventing cover 7 shown in FIGS. 2 and 3 is formed of a synthetic resin. The water preventing cover 7 covers the reflector 10, the sub-board 9, and the FPC 14 in FIG. 4 from the driver seat side (side indicated by arrow in FIG. 2), and covers part of each of the lid body 6 and the housing 5.

Figure 7:
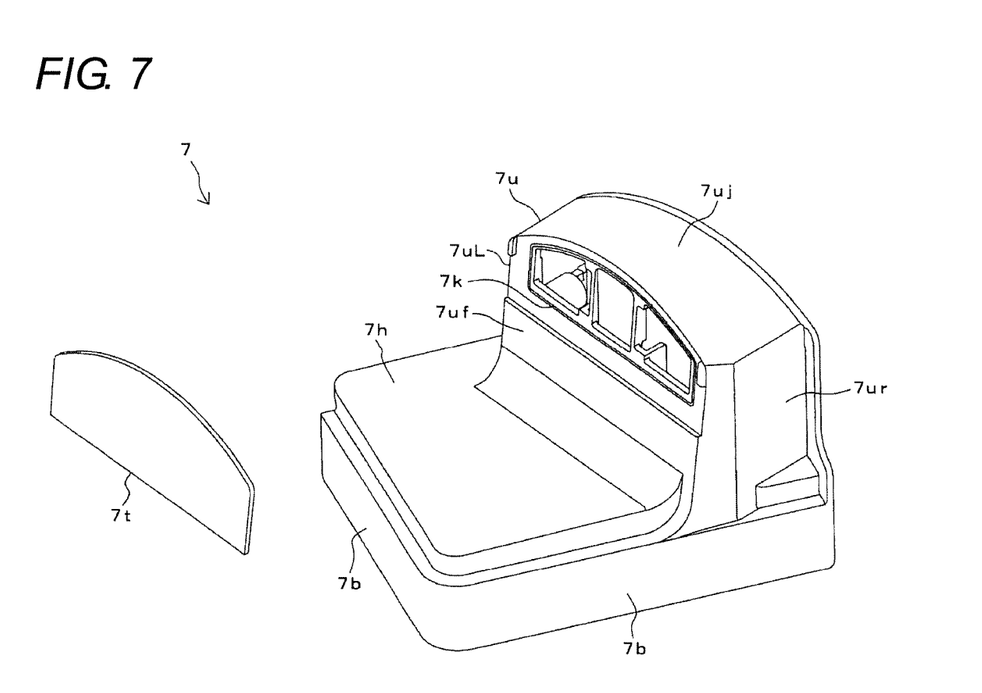
FIG. 7 is a perspective view of a water preventing cover in FIG. 2.
Figure 8:
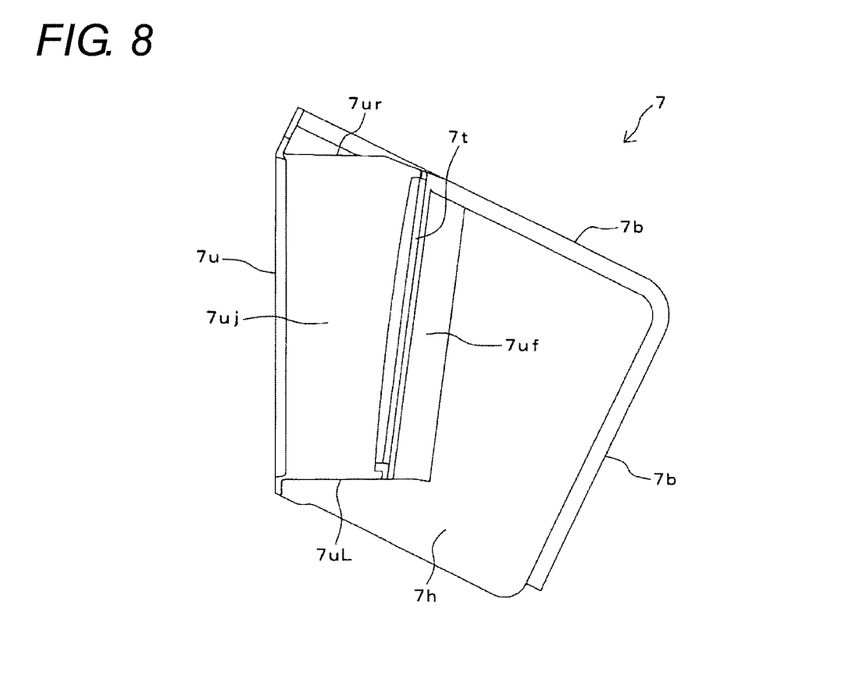
FIG. 8 is a plan view of the water preventing cover in FIG. 2.
Figure 9:
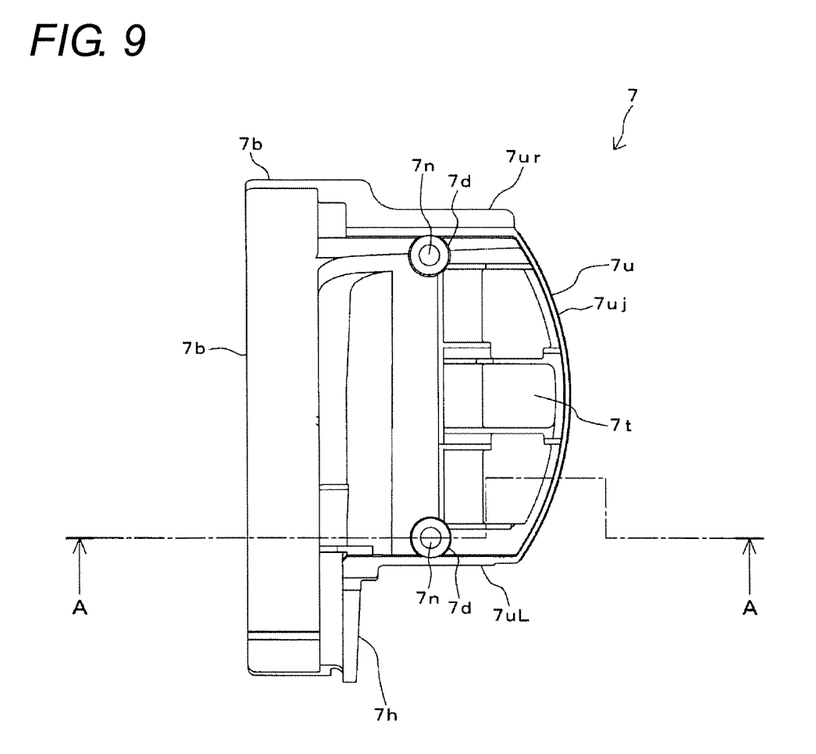
FIG. 9 is a rear view of the water preventing cover in FIG. 2.
Figure 10:
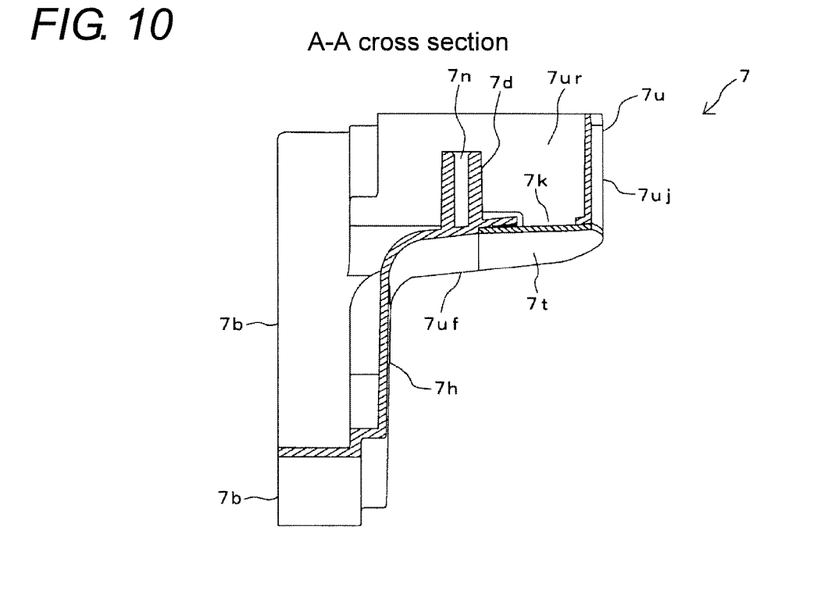
FIG. 10 is a cross-sectional view taken along line A-A in FIG. 9.

FIG. 7 is a perspective view of the water preventing cover 7. FIG. 8 is a plan view of the water preventing cover 7. FIG. 9 is a rear view (view seen from the left in FIG. 8) of the water preventing cover 7. FIG. 10 is a cross-sectional view taken along line A-A of the water preventing cover 7 in FIG. 9.

The water preventing cover 7 has a horizontal portion 7h, an upper protruding portion 7u, and a hanging portion 7b. As shown in FIG. 8, the horizontal portion 7h is formed into a trapezoidal shape when viewed from above. The upper protruding portion 7u is provided in a rear portion (a right portion in FIG. 7, a left portion in FIG. 8) of the horizontal portion 7h, and protrudes upward continuously from the horizontal portion 7h, as shown in FIGS. 7 and 10, and the like. As shown in FIG. 8 and the like, the upper protruding portion 7u is configured of a front side wall 7uf, left and right side walls 7uL, 7ur, and a ceiling wall 7uj.

As shown in FIGS. 7 and 8, the hanging portions 7b are provided on a front portion and one side portion of the horizontal portion 7h, and as shown in FIGS. 2 and 7, the hanging portions 7b hang continuously from the horizontal portion 7h. Further, the hanging portions 7b are continuous to each other in a circumferential direction of the horizontal portion 7h.

As shown in FIGS. 8 to 10, the front side wall 7uf of the upper protruding portion 7u is provided with a transmitting portion 7t configured to transmit light. As shown in FIG. 7, the transmitting portion 7t is a separate body from the other portions of the water preventing cover 7, and is formed into a flat plate shape. The transmitting portion 7t is fitted into a through hole 7k formed in the front side wall 7uf. As shown in FIG. 3, in the design cover 20, an opening 20k configured to expose the transmitting portion 7t is formed.

As shown in FIG. 10, a back side (side opposite to the front side wall 7uf) of the upper protruding portion 7u is opened toward a rear side (upper side in FIG. 10). Also, as shown in FIGS. 9 and 10, on an inside of the upper protruding portion 7u, a pair of seats 7d protruding rearward is formed. A screw hole 7n is formed in each of the seats 7d. In FIG. 10, only one of the seats 7d and one of the screw holes 7n are shown. As shown in FIG. 4, a through hole 6n is formed in the holder 6h of the lid body 6 so as to correspond to each of the screw holes 7n. Although one through hole 6n is provided at each of left and right end portions of the holder 6h, only the through hole 6n at the left end portion is shown in FIG. 4.

In FIG. 4, the water preventing cover 7 (FIG. 2) is placed so as to cover the reflector 10, the sub-board 9, and the holder 6h of the lid body 6, and contains the reflector 10, the sub-board 9, and the holder 6h inside the upper protruding portion 7*u* of the water preventing cover 7. Then, screws (not shown) are passed through the through holes 6*n* of the holder 6*h* from the rear, and then the screws are screwed into the screw holes 7*n* of the upper protruding portion 7*u*. This allows the water preventing cover 7, the reflector 10, the sub-board 9, and the lid body 6 to be fixed. Further, the reflector 10 and the sub-board 9 are sandwiched between the front side wall 7*uf* of the upper protruding portion 7*u* in the water preventing cover 7, and the holder 6*h* of the lid body 6 (not shown in detail).

In the state shown in FIG. 2, the horizontal portion 7*h* of the water preventing cover 7 covers an almost half of an area on the driver seat side of the upper surface of the lid body 6. The FPC 14 is also covered with this horizontal portion 7*h*. In addition, the upper protruding portion 7*u* of the water preventing cover 7 covers the reflector 10, the sub-board 9, and the like in FIG. 3. Further, the hanging portion 7*b* of the water preventing cover 7 is engaged with the lid body 6 and the housing 5 to cover part of side surfaces of each of the lid body 6 and the housing 5 (side surface on the driver seat side and one side surface adjacent thereto), and a boundary S of the same. The heat radiator 5*f* provided in the lower portion of the housing 5 is not covered with the water preventing cover 7.

The imager 2 and the illuminators 3 mounted on the sub-board 9 are opposed to the transmitting portion 7*t* of the water preventing cover 7. Therefore, after the light projected from the illuminator 3 is transmitted through the optical filters 11*b* and 11*c*, it is transmitted through the transmitting portion 7*t*, passes through the opening 20*k* of the design cover 20, and is projected to the driver seat side. This projected light is then reflected at a headrest of the driver seat, the seat, the face of the driver seated in the driver seat and the like. The reflected light passes through the opening 20*k* of the design cover 20 and is transmitted through the transmitting portion 7*t*, and is further transmitted through the optical filter 11*a* and the light receiving lens 12, and then enters the imager 2. At this time, a front surface and a back surface of the transmitting portion 7*t* are formed flat so that no extra optical change occurs in the reflected light.

According to the above-described embodiment, the reflector 10, the sub-board 9, and the imager 2 and the illuminators 3 mounted on the sub-board 9, the FPC 14, the lid body 6, and the housing 5 are covered with the water preventing cover 7 from the driver seat side. Therefore, even if a liquid such as a drink or the like falls on the design cover 20, the water preventing cover 7 can prevent the reflector 10, the sub-board 9, the imager 2, the illuminators 3, the FPC 14, the lid body 6, and the housing 5 from becoming wet with the liquid. Moreover, the water preventing cover 7 can prevent a liquid flowing down from the driver seat side along the design cover 20 from entering through a gap between the FPC 14 and the through hole 6*k* of the lid body 6, and a gap between the lid body 6 and the housing 5, and can also prevent the main board 10 inside the housing 5 from becoming wet. Therefore, a short circuit can be restrained from occurring in the imager 2, the illuminators 3, the sub-board 9, the main board 8, the controller 1 mounted on the main board 8, the FPC 14, and the like, thereby causing breakdown of the occupant monitoring device 100.

Moreover, in the above-described embodiment, the water preventing cover 7 is provided with the transmitting portion 7*t* configured to transmit the projected light from the illuminators 3 and its reflected light. Therefore, even when the sub-board 9 is covered with the water preventing cover 7, there is no obstacle to the imaging of the face of the driver by the imager 2.

In addition, in the above-described embodiment, the plate surface of the sub-board 9 is oriented vertically, the sub-board 9 is disposed above the lid body 6, and the sub-board 9 and the reflector 10 are also covered with the water preventing cover 7 from above. Therefore, the water preventing cover 7 can prevent the liquid flowing down along the design cover 20 disposed above from falling on the reflector 10, the sub-board 9, the imager 2, and the illuminators 3.

Further, in the above-described embodiment, the water preventing cover 7 is provided with the horizontal portion 7*h*, the upper protruding portion 7*u*, and the hanging portion 7*b*. Therefore, the upper protruding portion 7*u* of the water preventing cover 7 can prevent the liquid falling from the driver seat side, the upper side, and the right and left sides from falling on the reflector 10, the sub-board 9, the imager 2, and the illuminators 3. Moreover, the upper protruding portion 7*u* and the horizontal portion 7*h* of the water preventing cover 7 can prevent the liquid coming from the driver seat side from falling on the FPC 14 or the upper surface of the lid body 6, or from passing through the gap between the FPC 14 and the through hole 6*k* of the lid body 6, and entering to the main board 8 inside the housing 5. In addition, the hanging portion 7*b* of the water preventing cover 7 can prevent the liquid coming from the driver seat side or the liquid flowing down along the upper protruding portion 7*u* and the horizontal portion 7*h* from passing through the boundary S between the side surfaces on the driver seat side of the lid body 6 and the housing 5, and entering to the main board 8 inside the housing 5. Further, the liquid can also be discharged to a lower side of the housing 5 from the hanging portion 7*b* along the water preventing cover 7.

When the projected light from the illuminators 3 and the reflected light from the driver are transmitted through the transmitting portion 7*t* of the water preventing cover 7, there is a possibility that an extra optical change occurs in the light. If this optical change is large, the imager 2 cannot accurately image the face of the driver, which deteriorates monitoring performance. However, in the above-described embodiment, since the transmitting portion 7*t* of the water preventing cover 7 is formed into a flat plate shape, the optical change of the projected light or the reflected light when the projected light or the reflected light is transmitted through the transmitting portion 7*t* can be kept small. This enables the imager 2 to accurately image the face of the driver, and the monitoring performance of the face of the driver to be improved.

Moreover, for example, if the transmitting portion 7*t* and the other portions of the water preventing cover 7 are integrally molded with a synthetic resin, there is a possibility that a sink mark, a warp or the like easily occurs in the transmitting portion 7*t*, and that a flatness of the transmitting portion 7*t* is lowered. However, in the above-described embodiment, the transmitting portion 7*t* is formed separately from the other portions of the water preventing cover 7, and is fitted into the through hole 7*k* provided in the upper protruding portion 7*u*. Therefore, a sink mark, a warp, or the like due to molding hardly occurs in the transmitting portion 7*t*, and the flatness of the transmitting portion 7*t* is improved, so that the optical change of the light by the transmitting portion 7*t* can reliably be kept small.

Furthermore, in the above-described embodiment, since the heat radiator 5*f* is provided in the lower portion of the housing 5, the heat radiator 5*f* can radiate the heat generated from the controller 1 and retained in the main board 8 and the housing 5 to an outside. Further, since the heat radiator 5*f* is not covered with the water preventing cover 7, heat radiation from the heat radiator 5*f* to the outside can be hindered from being disturbed by the water preventing cover 7.

The present invention can employ various embodiments other than the foregoing. While for example, in the above-described embodiment, the example has been described in which the reflector 10, the sub-board 9, the FPC 14, the lid body 6, and the housing 5 are covered with the water preventing cover 7 from the driver seat side, the present invention is not limited thereto. In addition to this, the water preventing cover may be formed so as to cover the reflector 10, the sub-board 9, the FPC 14, the lid body 6, and the housing 5 from a direction other than the driver seat side.

While in the above-described embodiment, the example has been described in which the main board 8 is oriented horizontally, and the sub-board 9 is oriented vertically above the main board 8, the present invention is not limited thereto. In addition to this, for example, the imager 2 and the illuminators 3 may be mounted on the sub-board 9 so that optical axis directions of the imager 2 and the illuminators 3 are parallel to the plate surface of the sub-board 9, and the sub-board 9 may be horizontally oriented. Further, the main board 8 may be oriented vertically. Further, the main board 8 and the sub-board 9 may be disposed in parallel.

Moreover, while in the above-described embodiment, the example has been described in which the water preventing cover 7 is fixed to the holder 6*h* of the lid body 6 by screws, the present invention is not limited thereto. In addition to this, for example, the water preventing cover 7 may be fixed to the upper surface of the lid body 6, or the housing 5 by screws or fixing members other than screws.

Further, while in the above-described embodiment, the hanging portion 7*b* of the water preventing cover 7 covers the side surface on the driver seat side and the one side surface adjacent to the side surface on the driver seat side among the side surfaces of each of the lid body 6 and the housing 5, the hanging portion 7*b* may cover the side surface on the driver seat side and the other side surface adjacent to the side surface on the driver seat side. Alternatively, the hanging portion 7*b* may cover the side surface on the driver seat side and both side surfaces adjacent thereto the side surface on the driver seat side. In addition, the hanging portion 7*b* may cover only the side surface on the driver seat side or only one of both the side surfaces may be covered.

Further, while in the above-described embodiment, the example has been described in which the imager 2 configured of an infrared image sensor, and the illuminators 3 each configured of an infrared LED are used, the present invention is not limited only to the example, but another imager or other illuminators may be used. Further, numbers of installed imagers and illuminators may be selected as needed.

Further, while in the above-described embodiment, the present invention can be applied to the occupant monitoring device 100 configured to monitor the driver by imaging the face of the driver in the vehicle, the present invention can be applied to an occupant monitoring device configured to monitor a face of an occupant other than the driver in the vehicle or other than the face of the driver in the vehicle.

Further, while in the above-described embodiment, the example has been cited in which the present invention is applied to the occupant monitoring device 100 for the vehicle configured of the four-wheeled automobile, it is possible that the present invention is applied to an occupant monitoring device configured to monitor an occupant of another vehicle.

The invention claimed is:

1. An occupant monitoring device comprising:
an imager configured to image an occupant of a vehicle;
an illuminator configured to project light toward an occupant side; and
a controller configured to control operation of the imager and the illuminator, and monitor the occupant, based on an image captured by the imager to output a monitoring result,
wherein the occupant monitoring device further comprises:
a first board on which the controller is mounted;
a second board on which the imager and the illuminator are mounted;
a housing configured to contain the first board;
a lid body configured to close an opening of the housing and hold the second board on a side opposite to the first board so that the imager and the illuminator face the occupant side;
connection wiring penetrating the lid body, and electrically connecting the first board and the second board; and
a water preventing cover configured to cover the second board, the connection wiring, the lid body, and the housing from the occupant side, and transmit projected light from the illuminator and reflected light from the occupant.

2. The occupant monitoring device according to claim 1,
wherein the opening of the housing is a containing port of the first board opened upward,
wherein the first board is contained in the housing with a plate surface thereof oriented horizontally,
wherein the second board is held by the lid body with a plate surface thereof oriented vertically so that the second board is located above a center of the first board, and
wherein the water preventing cover also covers the second board from above.

3. The occupant monitoring device according to claim 1,
wherein the water preventing cover has:
a horizontal portion covering an upper surface of the lid body;
an upper protruding portion protruding upward continuously from the horizontal portion to cover the second board; and
a hanging portion hanging continuously from the horizontal portion to cover a gap between respective side surfaces of the lid body and the housing, the respective side surfaces facing the occupant side.

4. The occupant monitoring device according to claim 1,
wherein the water preventing cover has a transmitting portion configured to transmit the projected light and the reflected light, and
wherein the transmitting portion is formed into a flat plate shape.

5. The occupant monitoring device according to claim 4,
wherein the transmitting portion is a separate body from the other portions of the water preventing cover, and is fitted in a through hole formed in the water preventing cover.

6. The occupant monitoring device according to claim 1,
wherein the housing has a heat radiator configured to radiate heat generated from the controller and retained in the first board, and wherein the heat radiator is provided on a side opposite to the second board with respect to the first board, and is not covered with the water preventing cover.

\* \* \* \* \*